United States Patent
Li

(10) Patent No.: US 12,149,971 B1
(45) Date of Patent: Nov. 19, 2024

(54) WIRELESS COMMUNICATION METHOD AND APPARATUS THEREOF

(71) Applicant: TP-LINK CORPORATION PTE. LTD., Singapore (SG)

(72) Inventor: Haozheng Li, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/410,719

(22) Filed: Jan. 11, 2024

Related U.S. Application Data

(63) Continuation of application No. 18/496,872, filed on Oct. 29, 2023.

(51) Int. Cl.
H04W 24/08 (2009.01)

(52) U.S. Cl.
CPC .................. H04W 24/08 (2013.01)

(58) Field of Classification Search
CPC .................................... H04W 24/08
See application file for complete search history.

(56) References Cited

U.S. PATENT DOCUMENTS

| | | | |
|---|---|---|---|
| 2019/0140730 A1* | 5/2019 | Oteri | H04B 7/0695 |
| 2023/0388840 A1* | 11/2023 | Au | G01S 13/56 |

FOREIGN PATENT DOCUMENTS

| | | |
|---|---|---|
| CN | 115023964 A | 9/2022 |
| WO | 2023092350 A1 | 6/2023 |
| WO | 2023092364 A1 | 6/2023 |
| WO | 2023092508 A1 | 6/2023 |
| WO | WO-2023212936 A1 * | 11/2023 |

OTHER PUBLICATIONS

"IEEE P802.11bf™M/D1.0, Draft Standard for Information technology—Tele_x0002_communications and information exchange between systems Local and metropolitan area networks—Specific requirements, Part 11: Wireless LAN Medium Access Control (MAC) and Physical Layer (PHY) Specifications, Amendment 2: Enhancements for Wireless LAN Sensing", 2023, 243 pages.
Du, Rui, et al. "An overview on IEEE 802.11 bf: WLAN sensing." arXiv preprint arXiv:2310.17661 (2023).

* cited by examiner

*Primary Examiner* — Ayanah S George
(74) *Attorney, Agent, or Firm* — Loeb & Loeb LLP

(57) ABSTRACT

The disclosure provides a method and an AP for wireless communication, an electronic device and a non-transitory computer-readable medium. The method for wireless communication, including: establishing a sensing session between an AP as a sensing initiator and a non-AP STA as a sensing responder, performing a first measurement, wherein the AP acts as a sensing transmitter and the STA acts as a sensing receiver; and in response to determining that a preset condition is met, switching from the first measurement to a second measurement, wherein the STA acts as a sensing transmitter and the AP acts as a sensing receiver.

19 Claims, 6 Drawing Sheets

WIRELESS COMMUNICATION METHOD AND APPARATUS THEREOF

This application is a continuation of U.S. patent application Ser. No. 18/496,872, filed on Oct. 29, 2023. The entire disclosure of the aforementioned applications is incorporated by reference as part of the disclosure of this application.

TECHNICAL FIELD

The invention relates to the technical field of wireless communication, in particular to a method and an AP for wireless communication, an electronic device and a non-transitory computer-readable medium.

BACKGROUND

Over the past 20 years, Wi-Fi has evolved from a fledgling WLAN technology based on the IEEE 802.11 standards to an essential aspect of business and daily life worldwide. The process of Wi-Fi sensing has been introduced, which includes one or more of the following steps: sensing session setup, sensing measurement setup, sensing measurement instance, sensing measurement setup termination, and sensing session termination. However, the sensing process still requires a significant amount of network resources, and further improvement is needed.

SUMMARY

According to an aspect of the present application, a method for wireless communication is provided. The method may comprise: establishing a sensing session between an AP as a sensing initiator and a non-AP STA as a sensing responder; performing a first measurement, wherein the AP acts as a sensing transmitter and the STA acts as a sensing receiver; and in response to determining that a preset condition is met, switching from the first measurement to a second measurement, wherein the STA acts as a sensing transmitter and the AP acts as a sensing receiver.

According to another aspect of the present application, an AP for wireless communication is provided is provided. The AP is configured to: establish a sensing session an AP as a sensing initiator and a non-AP STA as a sensing responder; perform a first measurement, wherein the AP acts as a sensing transmitter and the STA acts as a sensing receiver; and in response to determining that a preset condition is met, switch from the first measurement to a second measurement, wherein the STA acts as a sensing transmitter and the AP acts as a sensing receiver.

According to another aspect of present application, an electronic device is provided, which comprises: a processor, and a memory having stored there on computer programs which, when executed by the processor, cause the processor to perform the above method.

According to another aspect of present application, a computer-readable storage medium is provided, which has stored thereon computer programs which, when executed by the processor, cause the processor to perform the above method.

BRIEF DESCRIPTION OF THE DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings can be obtained according to these drawings of the embodiments of present application for those skilled in the art.

DETAILED DESCRIPTION

Figure 1:
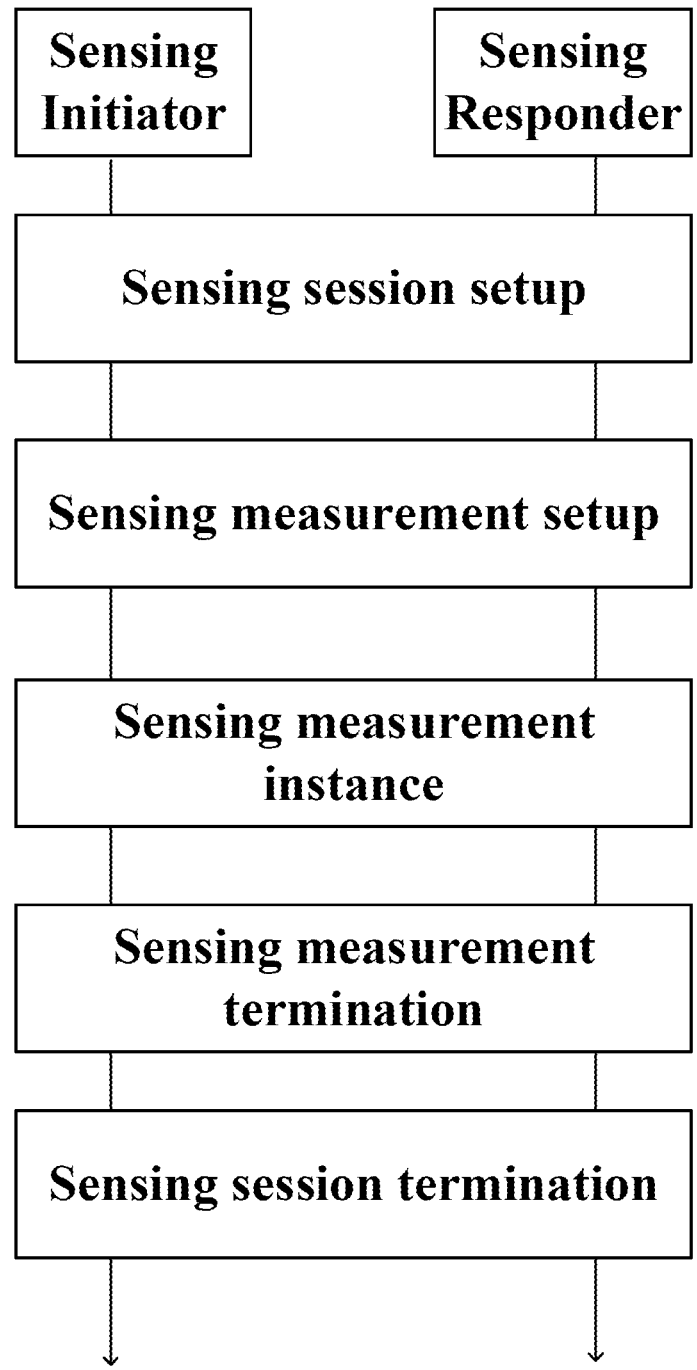
FIG. 1 illustrates a schematic diagram of a WiFi sensing process according to an embodiment of present application.

In order to provide a clearer and more complete description of the purpose, technical solution, and advantages of the present disclosure, the following description, in conjunction with the accompanying drawings, will provide a clear and comprehensive understanding of the technical solution in the present disclosure. It should be noted that the described embodiments are only a part of the embodiments disclosed herein, and not the entire embodiments. All other embodiments that ordinary skilled persons in the art can obtain without exercising inventive labor based on the embodiments disclosed herein are within the scope of the present disclosure.

The terms "first," "second," "third," "fourth," etc. (if present) used in the specification and claims, as well as in the accompanying drawings, are used to distinguish similar objects and are not necessarily used to describe a specific order or sequence. It should be understood that the use of such data can be interchangeable in appropriate circumstances, so that the embodiments of the present disclosure described herein can be implemented in an order other than that shown or described here.

It should be understood that the numbering of the processes in various embodiments of the present disclosure does not imply a specific order of execution. The execution order of the processes should be determined based on their functionality and inherent logic, and should not impose any limitations on the implementation process of the embodiments of the present disclosure.

It should be understood that the terms "comprising" and "having" and their variations intend to cover non-exclusive inclusion, such as a process, method, system, product, or apparatus that includes a series of steps or units, not necessarily limited to those explicitly listed, but may include other steps or units that are inherently present in these processes, methods, products, or apparatus.

It should be understood that the term "multiple" means two or more. The term "and/or" is merely a description of the associated relationship between related objects, indicating that there can be three possible relationships. For example, "A and/or B" can mean: A exists alone, A and B exist simultaneously, or B exists alone. The character "/" generally indicates an "or" relationship between the preceding and following related objects. "Including A, B, and C," "including A, B, C" means that A, B, and C are all included, and "including A, B, or C" means that one of A, B, and C is included. "Including A, B and/or C" means that any one or two or all three of A, B, and C are included.

It should be understood that "corresponding to B with A," "corresponding to A with B," "A corresponds to B," or "B corresponds to A" means that B is associated with A and can be determined based on A. Determining B based on A does not mean that B can only be determined based on A, but can also be determined based on A and/or other information. The matching of A and B means that the similarity between A and B is greater than or equal to a predetermined threshold.

Depending on the context, the term "if" used herein can be interpreted as "when" or "in response to determining" or "in response to detecting."

The following specific embodiments will provide a detailed description of the technical solution of the present disclosure. These specific embodiments can be combined with each other, and certain concepts or processes may not be reiterated At Some embodiments if they are the same or similar. In order to provide a clearer understanding of the purpose, technical solution, and advantages of the present disclosure, the following description will be provided in conjunction with the accompanying drawings.

The IEEE 802.11 standards define wireless communications, including the use of Wi-Fi sensing. Wi-Fi sensing aims to detect objects within the propagation space of Wi-Fi signals, without the need for the objects to carry any signal transmitting or receiving devices. For instance, the 802.11bf standard specifies Wi-Fi sensing for applications such as human target localization, position tracking, motion recognition, and gesture recognition. Sensing is achieved by tracking channel estimates obtained from decoding multiple Wi-Fi packets over time and detecting variations that indicate an event of interest.

However, the Wi-Fi sensing procedure may require a significant amount of computing resources and network resource, since the size of channel state information(CSI) can be large. Without optimization, Wi-Fi sensing can consume substantial network resources. Various solutions have been proposed to reduce the network overhead in Wi-Fi sensing. Certain approaches aim to decrease the volume of CSI, yet this reduction in data size could potentially come at the cost of sensing accuracy. Moreover, these approaches are still required to provide a specific amount of CSI feedback. Therefore, further improvements are needed.

The present application proposes a solution that involves exchanging sensing roles of WiFi devices. In this approach, low-precision CSI is employed when the sensing task is non-urgent, while high-precision CSI is used for urgent tasks. Specifically, the application operates in either a "low-performance (such as the utilization of low-precision CSI) with low network resource occupancy" or a "high-performance (for instance, utilizing high-precision CSI) with high network resource occupancy" mode based on the urgency of the sensing task. The present application achieves a balance between resource utilization and precision, ultimately leading to a reduction in network workload without compromising the accuracy of the sensing task.

In the following sections, the present application will provide a more detailed description of the method for wireless communication, with the reference to FIGS. 1-7

FIG. 1 illustrates a schematic diagram of a WiFi sensing process according to an embodiment of present application.

Wi-Fi sensing involves two main devices: the Sensing Initiator and the Sensing Responder. The Sensing Initiator can be a non-directional multi-gigabit (non-DMG) station (STA) that initiates a wireless local area network (WLAN) sensing procedure by having a Sensing Measurement Setup Request frame transmitted, or a DMG STA that initiates a DMG sensing procedure by having a DMG Sensing Measurement Setup Request frame transmitted. The Sensing Responder can be a non-directional multi-gigabit (non-DMG) station (STA) that participates in a WLAN sensing procedure by responding to a sensing initiator, or a DMG STA that participates in a DMG sensing procedure by responding to a sensing initiator. A sensing session is established right at the outset, often initiated as soon as an AP and a STA are initially associated. During a sensing session, CSI feedback takes place. CSI feedback refers to the process of transmitting the computed CSI data. Currently, more powerful APs are typically performed as the Initiators, while less powerful non-AP STAs act as the Responders. This design considers that APs are usually the ones that require CSI.

During the Wi-Fi sensing process, frames containing training information, typically NULL Data Packets or NDP frames, are transmitted from the Sensing Transmitter. These frames pass through the channel, which represents the area including the object of interest, and are received by the Sensing Receiver. The training information is altered due to the effects of the propagation channel. By performing calculations, the CSI reflecting the channel conditions can be obtained. Since all activities of the target occur within this channel, their state information, such as position, velocity, motion, etc., is reflected in the CSI. By applying appropriate algorithms, the desired results can be obtained, achieving the goal of "sensing" or "perception".

In the Wi-Fi sensing procedure, the Sensing Initiator and Sensing Responder can be either an Access Point (AP) or a non-AP STA (client). Access Point (AP) or a non-AP STA (client) both can act as the sensing receiver or the sensing transmitter. For example, the sensing receiver can be a station (STA) that is the intended recipient of PPDUs sent by a sensing transmitter and obtains measurements in either a WLAN sensing procedure or a directional multi-gigabit (DMG) sensing procedure. For another example, the sensing transmitter can be a station (STA) that transmits PPDUs used for measurements in a WLAN sensing procedure or a DMG sensing procedure. Additionally, the Transmitter refers to the party that sends NDP frames, and the Receiver refers to the party that receives NDP frames.

After the Initiator initiates the sensing request, the Responder is made to respond and establish the sensing measurement setup by the Initiator. This setup includes various parameters for the sensing instance, including the roles of the parties involved. The roles determine which party acts as the Transmitter to send NDP frames and which party acts as the Receiver to receive NDP frames.

Generally, the Receiver is the party that first computes the CSI. However, when the Receiver is not the party that requires the CSI (usually the Initiator), feedback needs to be provided to the Transmitter (also the Initiator) by the Receiver during the reporting phase of the sensing instance.

As shown in FIG. 1, WiFi sensing is mainly comprised of five stages as follows.

Sensing Session Setup: In this stage, a sensing session is established by the sensing initiator with the sensing responder(s), and sensing-related capabilities are exchanged between them. Multiple sensing sessions can exist simultaneously. The present disclosure is not limited thereto.

Sensing Measurement Setup: In this stage, the sensing initiator and the sensing responder exchange and agree on operational attributes associated with a sensing measurement instance. These attributes include the role of one or more pairs of STA and AP, the type of measurement report, and other operational parameters. Different sets of operational attributes are assigned to measurement setups by using different Measurement Setup IDs to identify a specific set of attributes. The present disclosure is not limited thereto.

Sensing Measurement Instance: In this stage, sensing measurements are performed. Different sensing measurement instances can be identified using Measurement Instance IDs. The present disclosure is not limited thereto.

Sensing Measurement Termination: In this stage, the corresponding sensing measurement setups are terminated by the sensing initiator and/or the sensing responder. The present disclosure is not limited thereto.

Sensing Session Termination: In this stage, the sensing session is terminated by the sensing initiator and/or the sensing responder. The present disclosure is not limited thereto.

Figure 2:
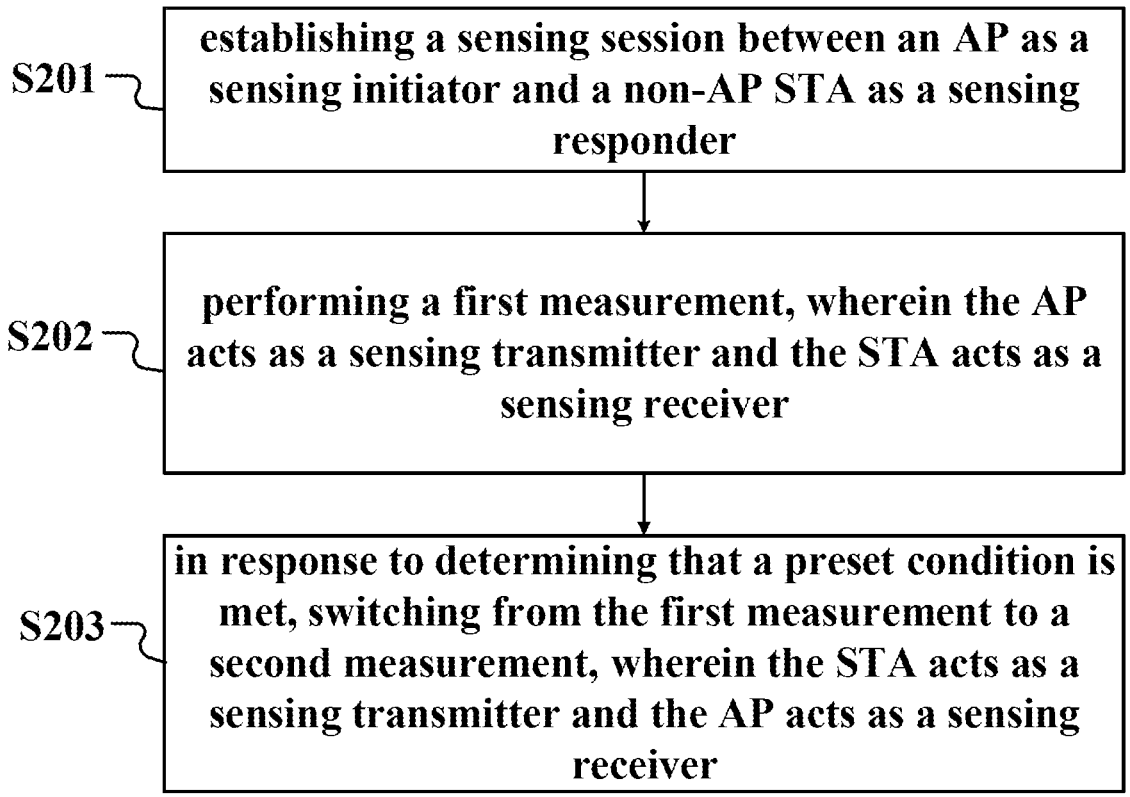
FIG. 2 illustrates a flowchart of the method for wireless communication according to an embodiment of the present application.

FIG. 2 illustrates a flowchart of the method for wireless communication according to an embodiment of the present application.

The method for wireless communication includes step S201 to step S203.

At S201, a sensing session is established between an AP as a sensing initiator and a non-AP STA as a sensing responder.

Optionally, at S201, sensing-related capabilities are exchanged between an AP as a sensing initiator and a non-AP STA as a sensing responder. The AP is acted as the high sensing performance device. In this session, as the party needing the CSI, transmission of data in the WiFi channel may be subsequently adjusted by the AP based on the CSI. The STA, as lower sensing performance device, is associated with the AP after establishment of the sensing session.

Optionally, at S201, the established sensing session is identified by the <AP's MAC address, non-AP STA's identifier>tuple, where the non-AP STA's identifier is one or more of the AID of the associated non-AP STA, or the USID of the non-AP STA if the non-AP STA is unassociated with the AP and is assigned to be a sensing responder.

At S202, a first measurement is performed, wherein the AP acts as a sensing transmitter and the STA acts as a sensing receiver.

The first measurement includes but not limited to sensing measurement setup and sensing instance stages. Negotiation of parameters for use At Subsequent sensing instances is done in the Sensing Measurement stage discussed above. Specifically, the AP is acted as the sensing initiator and the STA is acted as the sensing responder. The AP is also acted as the sensing transmitter while the STA is acted as the sensing receiver in terms of sensing roles. Downlink sensing is performed through sending of NDPs by the AP to obtain CSI reports by the STA. The data in the CSI reports is computed by the STA according to the received NDPs. The STA provides continuous feedback of the sensing results to the AP after computing the data in the CSI reports. Upon receiving the CSI reports, the AP is able to monitor changes in the channel condition.

Optionally, performing a first measurement comprises: transmitting, by the AP, a NULL Data Packet to the STA, and receiving, by the AP, a frame including an indication of CSI variation from the STA, wherein the CSI variation is calculated at least based on the measurement of the NULL Data Packet. The present disclosure is not limited thereto.

Optionally, at S202, a Sensing Measurement Setup Request frame is transmitted by the AP to the STA, including an identifier of the first measurement, an indication of allocation of sensing roles, an indication of enabling threshold-based reporting, and an indication of duration threshold. The present disclosure is not limited thereto.

At S203, in response to determining that a preset condition is met, switch from the first measurement to a second measurement, wherein the STA acts as a sensing transmitter and the AP acts as a sensing receiver.

Optionally, determining that a preset condition is met comprises: determining a duration of the CSI variation being less than a preset threshold; and in response to determining that the duration is equal to or longer than a preset duration threshold, determining that a preset condition is met. The present disclosure is not limited thereto.

Upon detection of satisfaction of a preset condition, such as when the overall channel is in a relatively stable state, use of the high sensing performance device, AP, for downlink sensing to monitor CSI may be not needed. Instead, the low sensing performance device, non-AP STA, is to be used for subsequent uplink sensing. The first sensing measurement is terminated/paused/deactivated and replaced with a second measurement using new sensing parameters.

Optionally, switching from the first measurement to a second measurement comprises: transmitting, by the AP, a sensing measurement termination frame including an identifier of the first measurement to the STA, transmitting, by the AP, a sensing measurement setup request including an identifier of the second measurement to the STA, and receiving, by the AP, a response including the identifier of the second measurement from the STA.

In the second measurement, the STA acts as a sensing transmitter and the AP acts as a sensing receiver. For example, performing a second measurement comprises: receiving, by the AP, a NULL Data Packet from the STA, and determining, by the AP, CSI variation at least based on the measurement of the NULL Data Packet. At Some cases, the second measurement has less NDP transmission frequency than the first measurement, or the second measurement has less NDP transmission power than the first measurement, or the second measurement has less NDP transmission bandwidth than the first measurement.

The second measurement also includes but not limited to sensing measurement setup and sensing instance stages. Optionally, since the AP continues acting as the initiator and receiver of the sensing PPDU or NDP packet, uplink sensing is directly performed by the AP upon receiving the NDP packets sent by the STA. Changes of WLAN channel are then continuously monitored by the AP according to the CSI measurement generated by itself.

Herein, uplink sensing refers to the process where the STA sends NDP packets, which are then measured by the AP upon receipt to obtain CSI. Downlink sensing refers to the process where the AP sends NDP packets, which are received by the STA to calculate the CSI report, and the CSI report is fed back to the AP. Specifically, in the second measurement, uplink sensing is performed by the AP as sensing receiver. In the first measurement, downlink sensing is performed by the AP as sensing transmitter.

Optionally, continued monitoring of the channel status is done by the AP in both the first measurement and the second measurement. Upon detection of the preset condition no longer being satisfied, such as when sudden drastic changes in the channel or abnormal CSI is observed, the higher sensing performance device AP needs to be acted as the transmitter again in order to obtain higher precision sensing measurement results. At this time, the second measurement is terminated/paused/deactivated and the first measurement restarted. Cyclical execution of this process enables long-term WiFi sensing measurements.

In addition, the method 20 is also applicable to scenarios with multiple STAs interacting with one or more AP, where each STA conducts a WiFi sensing session with the AP, and switching between the first and second measurements is performed in one or more sensing session based on the channel conditions, thereby achieving overall global optimization.

In the embodiments of the present disclosure, a low performance, low load sensing measurement (i.e. the second measurement) is adopted when the channel state is relatively stable, thereby saving network resources. A high performance, high load sensing measurement (i.e. the first measurement) is adopted when the channel changes drastically, thereby obtaining complete CSI without compromising sensing accuracy when the channel changes dramatically.

In certain embodiments of this disclosure, a low-performance, low-resource sensing measurement (the second measurement) is chosen when network performance deteriorates, thus network resources are released to enhance other non-sensing communication functions. Conversely, a high-performance, high-resource sensing measurement (the first measurement) is selected when network resources required for other non-sensing communication functions are relatively scarce.

The embodiments of the present disclosure propose a dynamic approach to sensing that allows for the exchange of roles between transmitter and receiver while maintaining high accuracy. By switching between high and low performance sensing measurement based on channel conditions, network resources can be optimized over extended sensing periods. This approach balances performance, accuracy, and resource utilization across the network, leveraging the capabilities of both the AP and STA. By dynamically adapting to sensing performance needs, an optimized sensing approach is achieved that is both efficient and effective.

Figure 3:
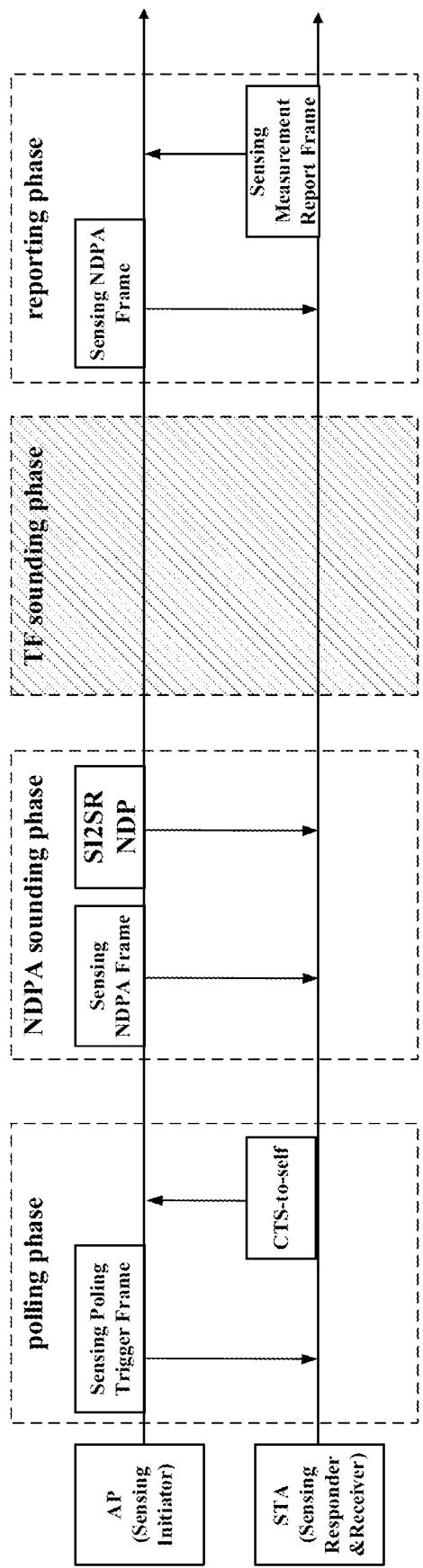
FIG. 3 shows a schematic diagram of the first measurement according to an embodiment of the present application.
Figure 4:
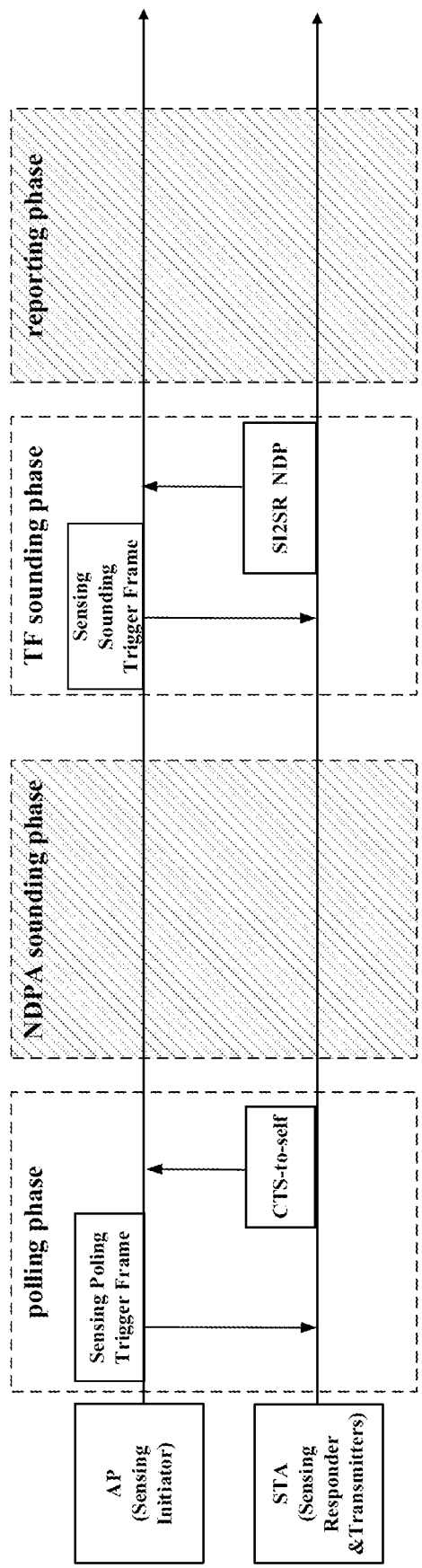
FIG. 4 shows a schematic diagram of a second measurement according to an embodiment of the present application.

Next, the first measurement and the second measurement will be described respectively with reference to FIGS. 3-4. FIG. 3 shows a schematic diagram of the first measurement according to an embodiment of the present application. FIG. 4 shows a schematic diagram of a second measurement according to an embodiment of the present application.

In FIG. 3, the sensing transmitter (for example AP) acts as the sensing initiator by having PPDUs, such as NDP transmissions, transmitted and having sensing performed using feedback from measurements taken by the sensing responder. The AP acts as a sensing initiator and has frames transmitted to a sensing responder associated with it. During a sensing measurement setup, the sensing responder is designated as a sensing receiver by the sensing initiator. For instance, if the Sensing Measurement Setup Request frame assigns the role of sensing receiver to the sensing responder and sets the Sensing Measurement Report Requested subfield to 1, Sensing Measurement Report frames are sent by the sensing responder at Sensing measurement instances resulting from the sensing measurement setup.

Upon successful negotiation, sensing measurements are performed in a sensing measurement instance of a WLAN sensing procedure. A TB sensing measurement instance of the first measurement includes at least one of a polling phase, an NDPA sounding phase, and a reporting phase. The Trigger Frame (TF) sounding phase can be omitted since the STA acts as a sensing receiver. At Some cases, the polling phase can also be omitted.

In FIG. 4, the sensing receiver acts as the sensing initiator by directly obtaining measurements using PPDUs transmitted by the sensing responder. The AP acts as a sensing initiator and has frames transmitted to a sensing responder associated with it. The sensing initiator assigns the Measurement Setup ID, which is used to uniquely identify the corresponding sensing measurement setup. During a sensing measurement setup, the sensing responder is designated as a Sensing transmitter by the sensing initiator.

Upon successful negotiation, sensing measurements are performed in a sensing measurement instance of a WLAN sensing procedure. A TB sensing measurement instance of the second measurement includes at least one of a polling phase and a Trigger frame (TF) sounding phase. NDPA sounding phase and Reporting phase can be omitted since the AP acts as a sensing receiver.

Figure 5:
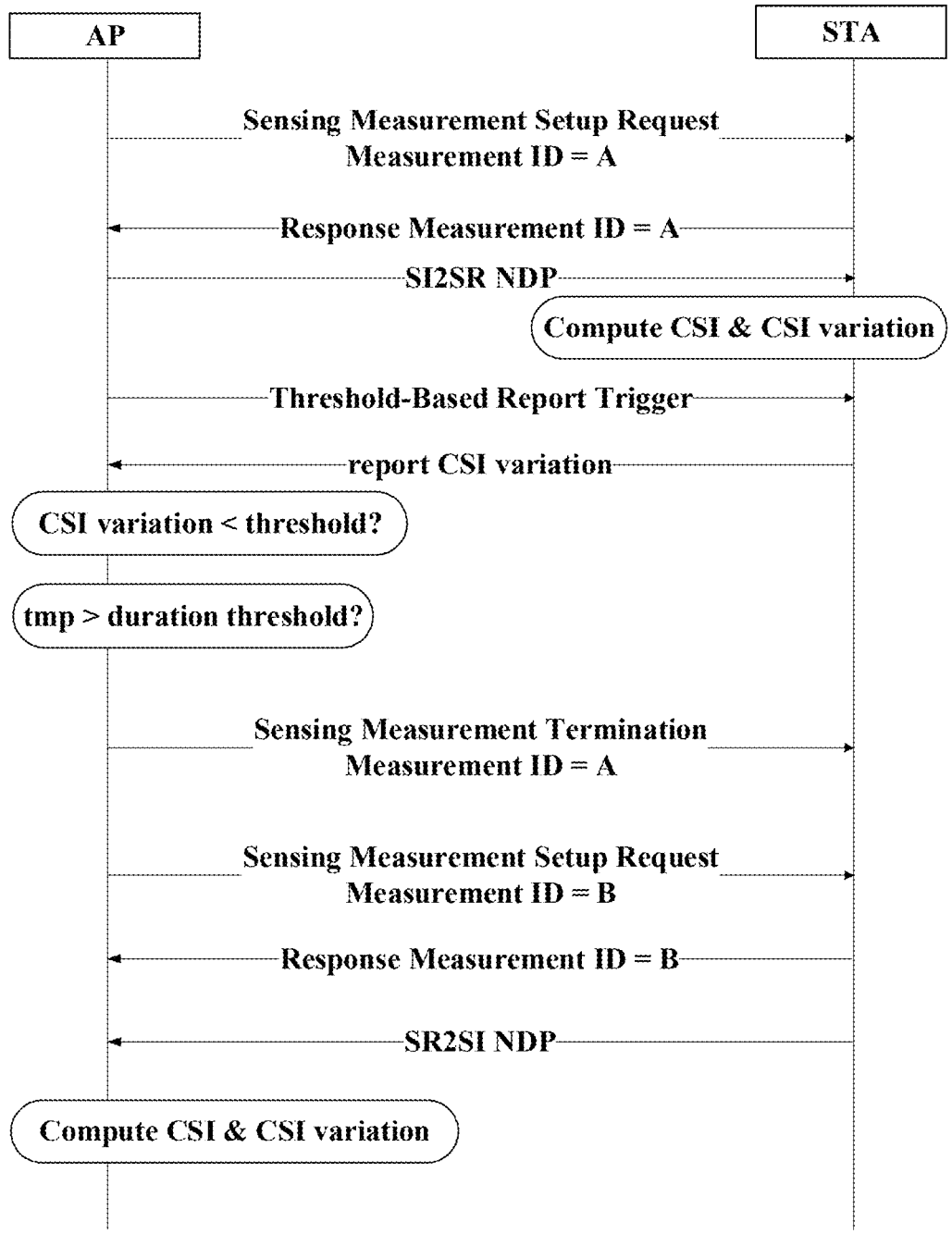
FIG. 5 illustrates a flowchart of the method for wireless communication according to an embodiment of the present application.

The following explains an embodiment of the present disclosure in more detail using FIG. 5, which includes additional details for implementing method 20.

At Step S201, a sensing session is established between an AP acting as a sensing initiator and a non-AP STA acting as a sensing responder. During the establishment of the sensing session, the AP and STA exchange their respective sensing capabilities. In a sensing session, the AP may participate in multiple concurrent sensing measurement setups either as a sensing initiator or as a sensing responder. Likewise, the non-AP STA may participate in multiple concurrent sensing measurement setups either as a sensing responder or as a sensing initiator. An AP may maintain multiple concurrent sensing sessions, each established with a different non-AP STA, to fulfill the requirements of a WLAN sensing procedure. Similarly, a non-AP STA may maintain multiple concurrent sensing sessions, each established with a different AP, to initiate or participate in different sensing measurement setups. The present disclosure is not limited to these examples.

In the sensing measurement phase of step S202, AP sends Sensing Measurement Setup Request frame (which includes measurement ID=A, which is a unique identifier of the first measurement), and coordinates sensing parameters with STA for next steps. These related parameters include but are not limited to: allocation of sensing roles, specifying AP as transmitter, STA as receiver; setting duration threshold of stable state duration; related settings of threshold-based reporting, and other necessary parameter settings. For example, threshold-based feedback mode is enabled. A duration threshold is also written, and this duration threshold is subsequently used to evaluate whether the channel stays in a stable state for a long time. After STA replies with Sensing Measurement Setup Response frame confirming (i.e. response in FIG. 5, which includes measurement ID=A), the two complete Sensing Measurement Setup marked by Measurement ID=A.

In the sensing instance phase of step S202, AP starts NDPA Sounding stage. In the process, it first sends NDP Announcement frame to STA as receiver to allocate resources, then sends SI2SR NDP for downlink sensing, to achieve parameter estimation of the target. The STA continuously receives the NDP. After receiving each NDP data packet, CSI is calculated based on the NDP data packet. STA receives NDP, calculates and obtains complete CSI, while calculating CSI variation at least based on partial CSI at previous time, then waits for reporting stage. AP enables threshold-based reporting stage, sends threshold-based Report Trigger frame requesting CSI variation feedback, and receives feedback frame sent by STA, based on the enabled threshold-based reporting, the CSI variation is continuously fed back to the AP.

Threshold-based reporting refers to dividing the original measurement reporting phase into a CSI variation feedback phase and a measurement feedback phase. As shown in FIG. 5, after the STA acting as receiver obtains the CSI, it calculates the variation between this CSI and the CSI obtained from the previous NDP packet. Before feeding back the full CSI, the STA first feeds back this CSI variation to the AP. The AP then compares this variation against a preset threshold and sends a trigger frame in the next stage based on the comparison result.

If the variation exceeds the threshold, the STA feeds back the complete CSI report, which the AP uses for sensing the target. If the variation does not exceed the threshold, the AP considers the target to be in a stable state. In this case, the AP records the duration TMP over which the variation stays below the threshold. The duration TMP can be calculated from the NDP packet interval and number of packets.

If TMP becomes greater than a preset duration threshold, then switches to the second measurementat Step S203. However, if TMP is less than the duration, the AP continues monitoring the variation. Once the variation exceeds the threshold again, TMP is cleared and the first measurement continues.

Specifically, in an aspect of the present disclosure, suppose the AP is engaged in the first measurement. If the TMP surpasses the preset duration threshold, the AP switches to the second measurement and resets TMP. However, if TMP remains below the duration threshold, the AP continues to monitor the CSI variation. If the variation remains below the threshold and TMP is less than the duration threshold, TMP accumulates with the feedback of CSI variation until TMP exceeds the duration threshold. Should a CSI variation greater than the threshold occur before TMP accumulates to the duration threshold, TMP is reset, and it starts accumulating again once the CSI variation falls below the threshold.

However, in an aspect of the present disclosure, assuming the AP is engaged in the second measurement, it should continuously monitor the CSI variation and switch back to the first measurement when the CSI variation exceeds the threshold. The threshold used for both the second measurement and the first measurement can either be the same or different.

Specifically, if TMP becomes greater than the duration threshold, it indicates the channel has been in a stable state for a sufficiently long time and is likely to remain so for longer. As the sensing performance requirements for the environment decrease, a STA with lower sensing capabilities can be utilized for transmitting sensing packets in subsequent monitoring. This enables the activation of the sensing role change mechanism so that the second sensing measurement is employed. That is, a determination is made that a preset condition has been met to initiate step S203.

At this point, the sensing role change mechanism is activated, the first measurement is terminated, and the second measurement is initiated. A sensing measurement termination frame with measurement ID=A can be sent by the AP to end the first sensing measurement. The AP then transmits a new sensing measurement setup request with measurement ID=B, uniquely identifying the second measurement. An agreement to the new sensing measurement is conveyed by the STA through a response with measurement ID=B.

As another example, at the same point, the first measurement is suspended, and the second measurement is initiated. A sensing measurement suspend frame with measurement ID=A can be sent by the AP to suspend the first sensing measurement. The AP then transmits a new sensing measurement setup request with measurement ID=B, uniquely identifying the second measurement. An agreement to the new sensing measurement is conveyed by the STA through a response with measurement ID=B.

In the sensing measurement phase of step S203, a sensing measurement is established with new parameters, with the AP acting as receiver and the STA as transmitter. The new parameters can also include reduced NDP transmission frequency, power, bandwidth and other sensing performance related fields. This further decreases network resource overhead in the stable environment.

In the sensing instance phase of step S203, a new sensing instance is established. As shown in FIG. 5, uplink sensing is performed with the new measurement sensing parameters determined At Step S203 at a lower packet transmission frequency. NDPs (e.g. SR2SI NDPs) are sent by the STA and received by the AP. In the new sensing parameters, TF sounding is conducted between the AP and STA, where an SR2SI Sounding Trigger frame requesting NDPs and allocating resources is first sent by the AP to the STA. The SR2SI NDPs are then sent by the STA to the AP, which calculates the CSI and monitors changes in the CSI. Since the AP remains the initiator, no sensing reporting phase is required. Variations in the CSI are continuously monitored by the AP.

If increasing CSI variation is found by the AP, even beyond a threshold, it indicates the channel state has undergone a large-scale change. For example, significant movements of either STAs or monitored objects (non-WiFi devices, such as humans without devices) might have occurred. These movements can result in changes in the channel due to the movement of STAs or passive objects . . . . In such cases, it may be beneficial for downlink sensing to be performed with the AP with higher sensing capabilities as transmitter and the STA as receiver to obtain higher accuracy. A sensing measurement termination frame with ID=B can then be sent by the AP, and a new sensing measurement setup request with ID=A can be sent, uniquely identifying the first measurement. Or, a sensing measurement suspend frame with ID=B can then be sent by the AP, and a sensing measurement restart request with ID=A can be sent for an example, uniquely identifying the first measurement. Of course, the sensing measurement restart request can also possess alternative IDs for the purpose of renegotiating the first measurement. In certain situations, a previous measurement identified by the ID=A may have already been terminated, releasing the ID=A for potential use by other measurements. In such cases, any measurement ID that does not conflict with existing measurement IDs can be employed.

Therefore, the embodiments of this disclosure save network resources while maintaining sensing performance. High capability, high load sensing is utilized when necessary, while low-capacity, low-resource sensing is employed when the monitored objects (non-WiFi devices, such as humans without devices) or environment are in a stable state . . . . When multiple devices cooperate on sensing tasks, this method can be applied considering different STA capabilities and overall workload to optimize globally.

Figure 6:
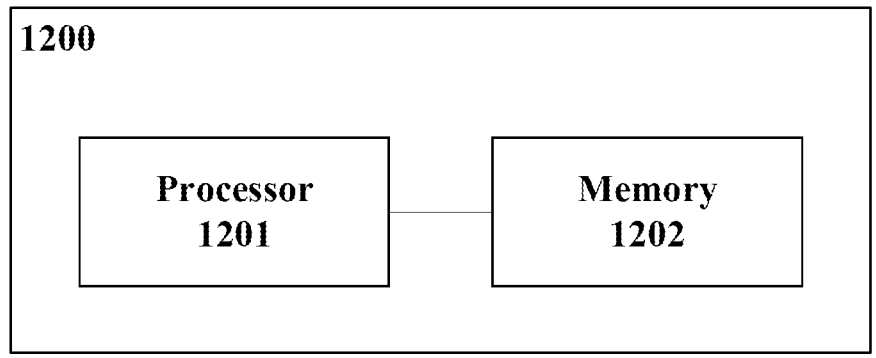
FIG. 6 shows a schematic diagram of wireless communication in accordance with an embodiment of the present disclosure.

As shown in FIG. 6, the electronic device 1200 comprises a processor 1201 and a memory 1202. It should be noted that although the electronic device 1200 in FIG. 6 is shown to comprise only two apparatuses, this is only illustrative, the electronic device 1200 may also comprise one or more other apparatuses (such as input apparatus, display apparatus, communication apparatus, etc.), these apparatuses are not related to the inventive concept and are therefore omitted herein.

The electronic device 1200 comprises a processor 1201; and a memory 1202 in which computer-readable instructions are stored, wherein a method for wireless communication is performed when the computer-readable instructions are executed by the processor, said method comprises: establishing a sensing session between an AP as a sensing initiator and a non-AP STA as a sensing responder; performing a first measurement, wherein the AP acts as a sensing transmitter and the STA acts as a sensing receiver; and in response to determining that a preset condition is met, switching from the first measurement to a second measurement, wherein the STA acts as a sensing transmitter and the AP acts as a sensing receiver.

Figure 7:
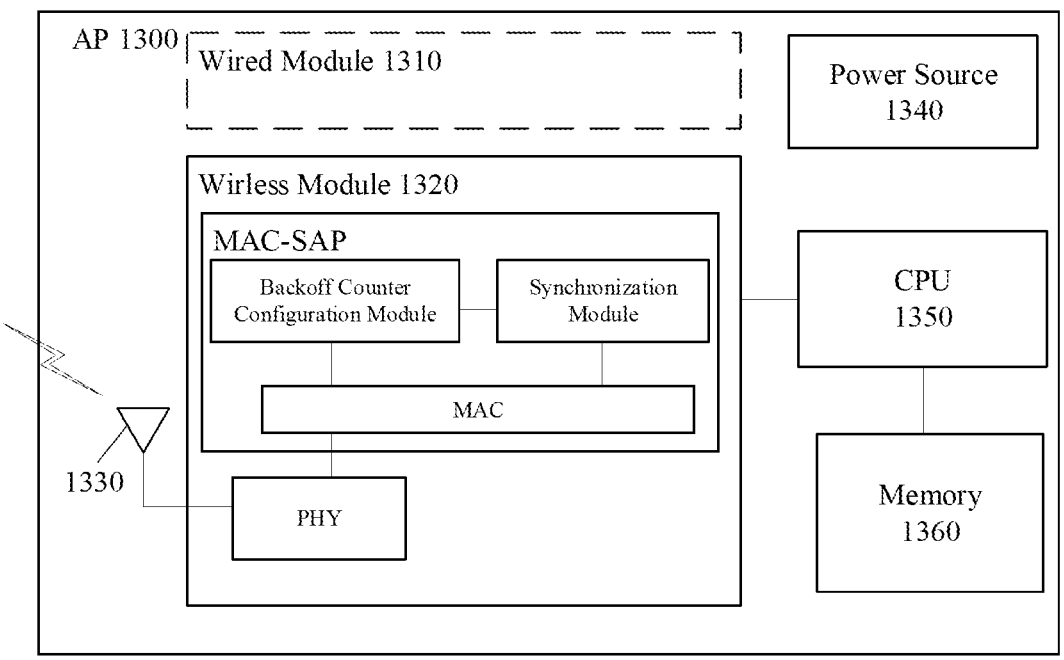
FIG. 7 shows an example configuration of a communication device, for example an AP, according to an embodiment of the present disclosure.

Further, FIG. 7 shows an example configuration of a communication device 1300, for example an AP, according to an embodiment of the present disclosure. The communication device 1300 may include a Wired module 1310 (optional), a Wireless module 1320, at least one antenna 1330 (for the sake of simplicity, only one antenna is shown in FIG. 7), a power source 1340, a central processing unit (CPU) 1350 and at least one memory 1360. The Wireless module 1320 may further comprise a MAC-SAP (service access point) (i.e., the MAC sublayer) and PHY (collectively referred to as the PHY sublayer). The MAC-SAP can comprise a backoff counter configuration module, a synchronization module, and MAC. The MAC and the PHY can constitute an AP, which can be used to establish a link and transmit/receive signal over a channel of the link via the antenna 1330. The backoff counter configuration module can be configured to configure a plurality of backoff counters for counting backoff slots with no medium activity of channels of the plurality of links, and other related operations as described above. The synchronization module can be configured to synchronize a count value of a backoff counter. The Wireless module 1320 and the CPU 1350 may function together as a circuit of the communication device 1300 configured to perform methods (e.g., method 20) as described in the present disclosure. It should be understood that the configuration of the communication device (e.g., AP) shown in FIG. 7 is merely as example, but not a limitation. The configuration of the communication device (e.g., AP) in the present disclosure can comprise more or less components than those in FIG. 7.

According to another aspect of the present disclosure, there is provided a computer-readable storage medium for storing a computer-readable program, the program causing a computer to perform the method for wireless communication as described above.

It is noted that one or more blocks (or operations) described with reference to FIGS. 1-6 may be combined with one or more blocks (or operations) described with reference to another of the figures. For example, one or more blocks (or operations) of FIG. 2 may be combined with one or more blocks (or operations) of FIGS. 3-6. As another example, one or more blocks associated with FIGS. 3-5 may be combined with one or more blocks (or operations) associated with FIG. 1 or 2.

At Some aspects, techniques for wireless communication may include an AP establishing a sensing session between an AP as a sensing initiator and a non-AP STA as a sensing responder; performing a first measurement, wherein the AP acts as a sensing transmitter and the STA acts as a sensing receiver; and in response to determining that a preset condition is met, switching from the first measurement to a second measurement, wherein the STA acts as a sensing transmitter and the AP acts as a sensing receiver. Techniques for wireless communication may include additional aspects, such as any single aspect or any combination of aspects described below and/or in connection with one or more other processes described elsewhere herein.

In a first aspect, an AP for wireless communication, configured to: establish a sensing session between an AP as a sensing initiator and a non-AP STA as a sensing responder; perform a first measurement, wherein the AP acts as a sensing transmitter and the STA acts as a sensing receiver; and in response to determining that a preset condition is met, switch from the first measurement to a second measurement, wherein the STA acts as a sensing transmitter and the AP acts as a sensing receiver.

In a second aspect, alone or in combination with the first aspect, when performing a first measurement, the AP is configured to: transmit, a NULL Data Packet to the STA, and receive, a frame including an indication of CSI variation from the STA, wherein the CSI variation is calculated at least based on the measurement of the NULL Data Packet.

In a third aspect, alone or in combination with the second aspect, when determining whether a preset condition is met, the AP is configured to: determine a duration of the CSI variation being less than a preset threshold; and in response to determining that the duration is equal to or longer than a preset duration threshold, determine that a preset condition is met.

In a fourth aspect, alone or in combination with the second aspect, the AP is further configured to perform the second measurement, wherein performing a second measurement comprises: receiving, by the AP, a NULL Data Packet from the STA, and determining, by the AP, CSI variation at least based on the measurement of the NULL Data Packet.

In a fifth aspect, alone or in combination with the fourth aspect, the AP is further configured to in response to determining that the CSI variation is above a preset threshold, switch from the second measurement to the first measurement.

In a sixth aspect, alone or in combination with the first aspect, when switching from the first measurement to a second measurement, the AP is configured to: transmit, a sensing measurement termination frame including an identifier of the first measurement to the STA, transmit, a sensing measurement setup request including an identifier of the second measurement to the STA, and receive, a response including the identifier of the second measurement from the STA.

In a seventh aspect, alone or in combination with the first aspect, the second measurement has less NDP transmission frequency than the first measurement, or the second measurement has less NDP transmission power than the first measurement, or the second measurement has less NDP transmission bandwidth than the first measurement.

In an eighth aspect, alone or in combination with the first aspect, a sensing measurement instance of the first measurement includes at least one of a polling phase, an NDPA sounding phase, and a reporting phase, a sensing measurement instance of the second measurement includes at least one of a polling phase and a Trigger frame sounding phase.

In a nineth aspect, alone or in combination with the first aspect, when performing the first measurement, the AP is configured to: transmit to the STA, a Sensing Measurement Setup Request frame including an identifier of the first measurement, an indication of allocation of sensing roles, an indication of enabling threshold-based reporting, and an indication of duration threshold.

At Some aspects, techniques for wireless communication may include a STA as a sensing responder; performing a first measurement, wherein the AP acts as a sensing transmitter and the STA acts as a sensing receiver; and in response to determining that a preset condition is met, switching from the first measurement to a second measurement, wherein the STA acts as a sensing transmitter and the AP acts as a sensing receiver. Techniques for wireless communication may include additional aspects, such as any single aspect or any combination of aspects described below and/or in connection with one or more other processes described elsewhere herein.

In a tenth aspect, a STA for wireless communication, configured to: confirm a sensing session between an AP as a sensing initiator and a non-AP STA as a sensing responder; perform a first measurement, wherein the AP acts as a sensing transmitter and the STA acts as a sensing receiver; and in response to determining that a preset condition is met, switch from the first measurement to a second measurement, wherein the STA acts as a sensing transmitter and the AP acts as a sensing receiver.

In an eleventh aspect, alone or in combination with the tenth aspect, when performing a first measurement, the STA is configured to: receive a NULL Data Packet from the AP, and transmit, a frame including an indication of CSI variation to the AP, wherein the CSI variation is calculated at least based on the measurement of the NULL Data Packet.

In a twelfth aspect, alone or in combination with the tenth aspect, when performing a second measurement, the STA is configured to: transmit, to the AP, a NULL Data Packet.

In a thirteenth aspect, alone or in combination with the tenth aspect, when switching from the first measurement to a second measurement, the STA is configured to: receive a sensing measurement termination frame including an identifier of the first measurement from the AP, receive, a sensing measurement setup request including an identifier of the second measurement from the AP, and transmit, a response including the identifier of the second measurement to the AP.

In a fourteenth aspect, alone or in combination with one or more of the first aspect through the thirteenth aspect, the second measurement has less NDP transmission frequency than the first measurement, or the second measurement has less NDP transmission power than the first measurement, or the second measurement has less NDP transmission bandwidth than the first measurement.

In a fifteenth aspect, alone or in combination with one or more of the first aspect through the fourteenth aspect, a sensing measurement instance of the first measurement includes at least one of a polling phase, an NDPA sounding phase, and a reporting phase, a sensing measurement instance of the second measurement includes at least one of a polling phase and a Trigger frame sounding phase.

In a sixteenth aspect, alone or in combination with one or more of the first aspect through the fifteenth aspect, when performing the first measurement, the STA is configured to: receive from the AP, a Sensing Measurement Setup Request frame including an identifier of the first measurement, an indication of allocation of sensing roles, an indication of enabling threshold-based reporting, and an indication of duration threshold.

Those of skill would appreciate that the logical blocks, modules, and algorithm steps described here may be implemented as electronic hardware, computer software, or a combination. This interchangeability of hardware and software is shown by the illustrative components described functionally. Whether the functionality is implemented in hardware or software depends on the application and constraints. Experts may implement the functionality in various ways for each application, but those choices do not depart from the scope here. Experts also recognize the examples of components, methods, and interactions here are merely illustrative; the components, methods, or interactions may be combined or performed differently.

The illustrative logic, blocks, modules, and processes described may be implemented as hardware, software, or a combination. This hardware and software interchangeability has been described generally in terms of functionality and illustrated in the components, blocks, modules, and processes. Whether the functionality is implemented in hardware or software depends on the application and constraints.

In an embodiment of the present disclosure, the processor may be a logic computing device with data processing capabilities and/or program execution capabilities, such as a central processing unit (CPU), a field programmable logic array (FPGA), a single chip microcomputer (MCU), a digital signal processor (DSP), an application specific integrated circuit (ASIC), or the like. The memory may be, for example, a volatile memory and/or a non-volatile memory. The volatile memory may include, for example, a random access memory (RAM) and/or a cache (Cache) or the like. The non-volatile memory may include, for example, a read only memory (ROM), a mechanical hard disk (HDD), a solid state drive (SSD), a flash memory (Flash), a USB flash drive, a memory card (SD, CF, MicroSD, etc.), and the like.

It will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "data block", "module", "engine", "unit," "module," or "system". Furthermore, aspects of the present disclosure may take the form of a computer program product embodied in one or more computer-readable media having computer-readable program code embodied thereon.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. A method for wireless communication, comprising:
   establishing a sensing session between an AP as a sensing initiator and a non-AP STA as a sensing responder;
   performing a first measurement in the sensing session, wherein the AP acts as a sensing transmitter and the STA acts as a sensing receiver; and
   in response to determining that a preset condition related to a duration of CSI variation is met, switching from the first measurement to a second measurement in the sensing session, wherein the STA acts as a sensing transmitter and the AP acts as a sensing receiver.

2. The method according to claim 1, wherein performing a first measurement comprises:
   transmitting, by the AP, a NULL Data Packet to the STA, and
   receiving, by the AP, a frame including an indication of CSI variation from the STA, wherein the CSI variation is calculated at least based on the measurement of the NULL Data Packet.

3. The method according to claim 2, wherein determining that a preset condition is met comprises:
   determining the duration of the CSI variation being less than a preset threshold; and
   in response to determining that the duration is equal to or longer than a preset duration threshold, determining that a preset condition is met.

4. The method according to claim 1, wherein performing a second measurement comprises:
   receiving, by the AP, a NULL Data Packet from the STA, and
   determining, by the AP, CSI variation at least based on the measurement of the NULL Data Packet.

5. The method according to claim 4, further comprises:
   in response to determining that the CSI variation is above a preset threshold, switching from the second measurement to the first measurement.

6. The method according to claim 1, wherein switching from the first measurement to a second measurement comprises:
   transmitting, by the AP, a sensing measurement termination frame including an identifier of the first measurement to the STA,
   transmitting, by the AP, a sensing measurement setup request including an identifier of the second measurement to the STA, and
   receiving, by the AP, a response including the identifier of the second measurement from the STA.

7. The method according to claim 1, wherein the second measurement has less NDP transmission frequency than the first measurement, or the second measurement has less NDP transmission power than the first measurement, or the second measurement has less NDP transmission bandwidth than the first measurement.

8. The method according to claim 1, wherein a sensing measurement instance of the first measurement includes at least one of a polling phase, an NDPA sounding phase, and a reporting phase, a sensing measurement instance of the second measurement includes at least one of a polling phase and a Trigger frame sounding phase.

9. The method according to claim 1, wherein performing the first measurement comprising:
   transmitting, by the AP, to the STA, a Sensing Measurement Setup Request frame including an identifier of the first measurement, an indication of allocation of sensing roles, an indication of enabling threshold-based reporting, and an indication of duration threshold.

10. An AP for wireless communication, configured to:
    establish a sensing session between an AP as a sensing initiator and a non-AP STA as a sensing responder;
    perform a first measurement in the sensing session, wherein the AP acts as a sensing transmitter and the STA acts as a sensing receiver; and
    in response to determining that a preset condition related to a duration of CSI variation is met, switch from the first measurement to a second measurement in the sensing session, wherein the STA acts as a sensing transmitter and the AP acts as a sensing receiver.

11. The AP according to claim 10, wherein when performing a first measurement, the AP is configured to:
    transmit, a NULL Data Packet to the STA, and
    receive, a frame including an indication of CSI variation from the STA, wherein the CSI variation is calculated at least based on the measurement of the NULL Data Packet.

12. The AP according to claim 11, wherein when determining whether a preset condition is met, the AP is configured to:
    determine the duration of the CSI variation being less than a preset threshold; and
    in response to determining that the duration is equal to or longer than a preset duration threshold, determine that a preset condition is met.

13. The AP according to claim 11, further configured to perform the second measurement,
    wherein performing a second measurement comprises:
    receiving, by the AP, a NULL Data Packet from the STA, and
    determining, by the AP, CSI variation at least based on the measurement of the NULL Data Packet.

14. The AP according to claim 13, further configured to:
    in response to determining that the CSI variation is above a preset threshold, switch from the second measurement to the first measurement.

15. The AP according to claim 10, wherein when switching from the first measurement to a second measurement, the AP is configured to:
    transmit, a sensing measurement termination frame including an identifier of the first measurement to the STA,
    transmit, a sensing measurement setup request including an identifier of the second measurement to the STA, and
    receive, a response including the identifier of the second measurement from the STA.

16. The AP according to claim 10, wherein the second measurement has less NDP transmission frequency than the first measurement, or the second measurement has less NDP transmission power than the first measurement, or the second measurement has less NDP transmission bandwidth than the first measurement.

17. The AP according to claim 10, wherein a sensing measurement instance of the first measurement includes at least one of a polling phase, an NDPA sounding phase, and a reporting phase, a sensing measurement instance of the second measurement includes at least one of a polling phase and a Trigger frame sounding phase.

18. The AP according to claim 10, wherein when performing the first measurement, the AP is configured to:
- transmit to the STA, a Sensing Measurement Setup Request frame including an identifier of the first measurement, an indication of allocation of sensing roles, an indication of enabling threshold-based reporting, and an indication of duration threshold.

19. An electronic device comprising:
- a processor, and
- a memory having stored there on computer programs which, when executed by the processor, cause the processor to perform the method according to claim 1.

* * * * *